Patented Aug. 29, 1933

1,924,786

UNITED STATES PATENT OFFICE 1,924,786

CRYSTALLIZED PEROXIDE FROM TETRAHYDRONAPHTHALENE

Max Hartmann, Riehen, near Basel, and Max Seiberth, Basel, Switzerland, assignors to Society of Chemical Industry in Basle, Basel, Switzerland No Drawing. Application April 25, 1933, Serial No. 667,936, and in Switzerland April 29, 1932

1 Claim. (Cl. 260—16)

It is known that by treatment of tetrahydronaphthalene in a liquid state with gases containing oxygen in the presence or absence of catalysts at raised temperature, α-keto-tetrahydronaphthalene is formed as principal product besides α-oxy-tetrahydronaphthalene. A peroxide is thereby evidently formed intermediarily which transforms with separation of water into the ketone, or with loss of oxygen into the alcohol.

It has now been found that the 1:2:3:4-tetrahydronaphthalene-1-peroxide of the probable formula

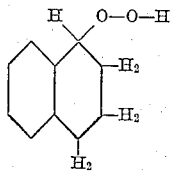

is obtained in a uniform crystallized state if the 1:2:3:4-tetrahydronaphthalene, either in the absence of catalysts at temperatures below 100° C., or in the presence of catalysts at temperatures below 60° C., is treated with gases containing oxygen.

For the production of the peroxide there will already suffice that the gases containing oxygen are passed into tetrahydronaphthalene at ordinary temperature. But the transformation occurs more quickly at raised temperature. A temperature of 100° C. must however not be exceeded since otherwise the reaction progresses further with formation of oily by-products. The formation of the peroxide is promoted by catalysts, but in this case the temperature must be kept lower in order to prevent decomposition. As catalysts metals or metal compounds may particularly be recommended such as for example tin, lead, lead oxide, etc.

The separation of the crystallized peroxide occurs preferably by inoculating and cooling the super-saturated solution. However, the unchanged tetrahydronaphthalene may also first be carefully distilled in a vacuum at temperatures below 100° C., whereupon the remaining peroxide immediately solidifies. Finally it may also be separated directly from its solution as a solid sodium compound by treatment with strong caustic soda solution. By the addition of acetic acid or carbonic acid to the aqueous solution of the sodium compound the free peroxide is separated again. The 1:2:3:4-tetrahydronaphthalene-1-peroxide forms colorless crystals of melting point 53 to 54° C. It is easily soluble in most organic solvents. From benzene or petroleum ether it may be recrystallized. By heating it strong decomposition sets in with separation of water. Decomposition also occurs when the peroxide is brought into contact with concentrated sulfuric acid. It dissolves in aqueous caustic soda solution with an alkaline reaction to phenol-phthaleine. A glacial acetic acid solution of the peroxide separates iodine on the addition of potassium iodide solution. The new peroxide finds use for technical and therapeutical purposes.

The reason, why in the hitherto known processes no solid peroxide is obtained by the introduction of gases containing oxygen into tetrahydronaphthalene, lies in the fact that the temperatures used have been too high, only decomposition products of the peroxide being thus formed, such as the α-keto- and the α-oxy-tetrahydronaphthalene.

The following examples illustrate the invention, the parts being by weight:—

Example 1

Oxygen or air are conducted into 500 parts of tetrahydronaphthalene at ordinary temperature for some days. If the tetrahydronaphthalene in excess is carefully distilled in a vacuum the remaining peroxide solidifies in a crystalline form when cooled. By recrystallization from benzene it can be purified. The tetrahydronaphthalene distilled off may be used in the same manner for a further oxidation.

Example 2

Air is passed into 1000 parts of tetrahydronaphthalene at ordinary temperature in the presence of tin filings. By cooling down and inoculation the tetrahydronaphthalene-1-peroxide is brought to crystallization and the crystals are separated from the mother liquor by filtration. Further quantities of the peroxide may be separated from the mother liquor by distilling the tetrahydronaphthalene in excess in a vacuum. The separation of the peroxide from its

Example 3

500 parts of tetrahydronaphthalene are oxidized by passing air into the mass at 70° C. By cooling the solution the peroxide separates in a crystalline form. For obtaining further quantities of the peroxide the mother liquor is shaken for a short time with strong caustic soda solution. The sodium compound of the peroxide separates as a thick white mash. The latter is separated by suction, washed with acetone, and dissolved in water. From the aqueous solution the free peroxide is then separated by means of dilute acetic acid. The peroxide is obtained in a pure form by taking up the precipitate in ether, dispelling the solvent and recrystallizing the residue from benzene.

solution in tetrahydronaphthalene may also be completed by the addition of petroleum ether.

What we claim is:—

1. 1:2:3:4-tetrahydronaphthalene-1-peroxide of the probable formula

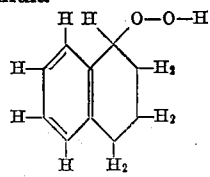

forming colorless crystals of melting point 53 to 54° C., decomposing in the heat or in contact with sulfuric acid, being soluble in most organic solvents and dilute caustic soda solution, and forming a solid sodium compound by treatment with strong caustic soda solution, said product being useful for technical and therapeutical purposes.

MAX HARTMANN
MAX SEIBERTH.